US012361319B2

(12) United States Patent
Russell et al.

(10) Patent No.: US 12,361,319 B2
(45) Date of Patent: Jul. 15, 2025

(54) INCIDENT RESOLUTION

(71) Applicant: INTERNATIONAL BUSINESS MACHINES CORPORATION, Armonk, NY (US)

(72) Inventors: Khalil Hervin Russell, London (GB); Wentian Fang, London (GB); Imran Bepari, London (GB); Martin Angelov, London (GB)

(73) Assignee: International Business Machines Corporation, Armonk, NY (US)

( * ) Notice: Subject to any disclaimer, the term of this patent is extended or adjusted under 35 U.S.C. 154(b) by 939 days.

(21) Appl. No.: 17/388,511

(22) Filed: Jul. 29, 2021

(65) Prior Publication Data

US 2023/0034173 A1    Feb. 2, 2023

(51) Int. Cl.
G06N 20/00    (2019.01)

(52) U.S. Cl.
CPC .................... G06N 20/00 (2019.01)

(58) Field of Classification Search
CPC ........................................... G06N 20/00
See application file for complete search history.

(56) References Cited

U.S. PATENT DOCUMENTS

| 9,818,067 | B2 | 11/2017 | Miranda |
| 10,241,809 | B2 | 3/2019 | Gopalakrishnan |
| 10,540,224 | B2 | 1/2020 | Brew et al. |
| 10,938,634 | B1* | 3/2021 | Cruise ................. H04L 41/0686 |
| 2014/0250125 | A1* | 9/2014 | Stuempfle ............. G06F 16/904 |
| | | | 707/737 |
| 2018/0025157 | A1* | 1/2018 | Titonis ................ H04W 12/128 |
| | | | 726/22 |
| 2018/0091528 | A1* | 3/2018 | Shahbaz ................. G06F 21/53 |
| 2018/0227322 | A1* | 8/2018 | Luo ..................... H04L 63/1425 |
| 2019/0163594 | A1 | 5/2019 | Hayden |
| 2019/0171469 | A1 | 6/2019 | Gopalakrishnan |
| 2019/0260789 | A1 | 8/2019 | Sharon |
| 2019/0370102 | A1 | 12/2019 | Settle |
| 2019/0391892 | A1 | 12/2019 | Sabharwal |
| 2020/0028918 | A1 | 1/2020 | Calcaterra |
| 2020/0167225 | A1* | 5/2020 | Gudka ................ G06F 11/0793 |

(Continued)

FOREIGN PATENT DOCUMENTS

WO    2019011018 A1    1/2019

OTHER PUBLICATIONS

Mell et al., "The NIST Definition of Cloud Computing", Recommendations of the National Institute of Standards and Technology, NIST Special Publication 800-145, Sep. 2011, 7 pages.

*Primary Examiner* — Michael J Huntley
*Assistant Examiner* — Maggie Thanh Maido
(74) *Attorney, Agent, or Firm* — Lily Neff

(57) ABSTRACT

Embodiments of the present invention provide concepts for identifying which runbook(s) to use for an incident. Information about the identified runbook(s) may then be distributed to a specific incident resolution solution that is deployed in an edge computing environment. For example, embodiments may provide for a machine-learning algorithm to be trained to predict or suggest the most appropriate runbook for resolving an incident. Using a description of an incident, the machine-learning algorithm may predict/suggest one or more runbooks for resolving the incident.

20 Claims, 8 Drawing Sheets

(56) References Cited

U.S. PATENT DOCUMENTS

| | | | |
|---|---|---|---|
| 2020/0285737 A1* | 9/2020 | Kraus | G06F 21/552 |
| 2020/0311262 A1* | 10/2020 | Nguyen | G06F 21/554 |
| 2020/0327371 A1 | 10/2020 | Sharma | |
| 2021/0406671 A1* | 12/2021 | Gasthaus | G06F 11/2263 |
| 2023/0367613 A1* | 11/2023 | Saraiya | G06F 11/3409 |

* cited by examiner

INCIDENT RESOLUTION

BACKGROUND

The technical character of the present invention generally relates to the field of Information Technology (IT) systems, and more particularly, systems and methods for incident management or resolution in IT systems.

In operations management and IT service management systems, there exist multiple paradigms for managing incidents. A widely known paradigm is incident management. Incident Management aims to manage the lifecycle of incidents (i.e. service interruptions, unplanned interruptions, or reductions in quality of IT services). A primary objective of an incident management process is to resolve an incident and return an IT service to users as quickly as possible.

Operation management systems, which typically include incident management systems along with other systems, usually include network and systems topology tools. They also include incident management capabilities, which enable operators to execute procedure and/or operations responsive to incidents, e.g. via a user interface.

A runbook is a compilation of routine procedures and operations that a system administrator or operator can execute. Typically, a runbook contains procedures to begin, stop, supervise, and debug the system. A runbook may also describe procedures for handling special requests and contingencies. A runbook may therefore allow a system administrator/operator, with prerequisite expertise, to effectively manage and troubleshoot an issue using a runbook as a reference. Through runbook automation, these processes can be carried out using software tools in a predetermined manner.

Although having a multitude of runbooks, information sources, information and tools can be useful for incident management, this may not help in meeting the primary objective of returning an IT service as quickly as possible. For instance, a large amount of runbooks being available to an operator can present a problem (e.g. the operator must search/consider all of the available runbooks and/or select an appropriate runbook), which detracts from the time the operator is able to spend addressing the actual issues.

SUMMARY

The present invention seeks to provide a method of training a machine learning algorithm for identifying a runbook for incident resolution. The present invention also seeks to provide a method for incident resolution at an edge computing environment. Such methods may be computer-implemented. That is, such methods may be implemented in a computer infrastructure having computer executable code tangibly embodied on a computer readable storage medium having programming instructions configured to perform a proposed method. The present invention further seeks to provide a computer program product including computer program code for implementing the proposed concepts when executed on a processor. The present invention yet further seeks to provide a system for training a machine learning algorithm for identifying a runbook for incident resolution. The invention also seeks to provide a system for incident resolution at an edge computing environment.

According to an aspect of the present invention there is provided a method of training a machine learning algorithm for identifying a runbook for incident resolution. The method comprises receiving: i) a description of a training incident; and ii) a training identifier of a runbook for resolving the training incident. The method also comprises training the machine learning algorithm based on the description of a training incident as a training input for the machine learning algorithm and the training identifier of the runbook for resolving the training incident as a training output for the machine learning algorithm.

According to another aspect of the present invention, there is provided a method for incident resolution at an edge computing environment. The method comprises providing a description of an incident to a machine learning algorithm for identifying a runbook for incident resolution. The method also comprises obtaining a prediction result from the machine learning algorithm based on the description of the incident, the prediction result including an identifier of a runbook. The method yet further comprises generating a runbook trigger for executing the runbook associated with the identifier included in the prediction result.

Embodiments may be employed in combination with conventional/existing incident management systems and/or incident resolution systems. In this way, embodiments may integrate into legacy systems so as to improve and/or extend their functionality and capabilities. An improved incident management/resolution system may therefore be provided by proposed embodiments.

According to another embodiment of the present invention, there is provided a computer program product for training a machine learning algorithm that is configured to identify a runbook for incident resolution, the computer program product comprising a computer readable storage medium having program instructions embodied therewith, the program instructions executable by a processing unit to cause the processing unit to perform a method according to one or more proposed embodiments when executed on at least one processor of a data processing system.

According to another embodiment of the present invention, there is provided a computer program product for incident resolution at an edge computing environment, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided an incident management system for training a machine learning algorithm for identifying a runbook for incident resolution. The system comprises a processor arrangement configured to perform the steps of: receiving: i) a description of a training incident; and ii) a training identifier of a runbook for resolving the training incident; and training the machine learning algorithm based on the description of a training incident as a training input for the machine learning algorithm and the training identifier of the runbook for resolving the training incident as a training output for the machine learning algorithm.

According to yet another aspect, there is provided a system for incident resolution at an edge computing environment. The system comprises a processor arrangement configured to perform the steps of: providing a description of an incident to a machine learning algorithm for identifying a runbook for incident resolution; obtaining a prediction result from the machine learning algorithm based on the description of the incident, the prediction result including an identifier of a runbook; and generating a runbook trigger for executing the runbook associated with the identifier included in the prediction result.

Thus, there may be proposed concepts for identifying which runbook(s) to use for an incident, and this may be done at a centralized event management system. Information about the identified runbook(s) may then be distributed to a specific incident resolution solution that is deployed in an edge computing environment. For instance, embodiments may provide for a machine-learning algorithm to be trained to predict or suggest the most appropriate runbook for resolving an incident. Using a description of an incident, the machine-learning algorithm may predict/suggest one or more runbooks for resolving the incident. Providing such automated runbook suggestions may help to reduce the time to identity a runbook for resolving an incident (i.e. issue), thus reducing a time taken to resolve the incident.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
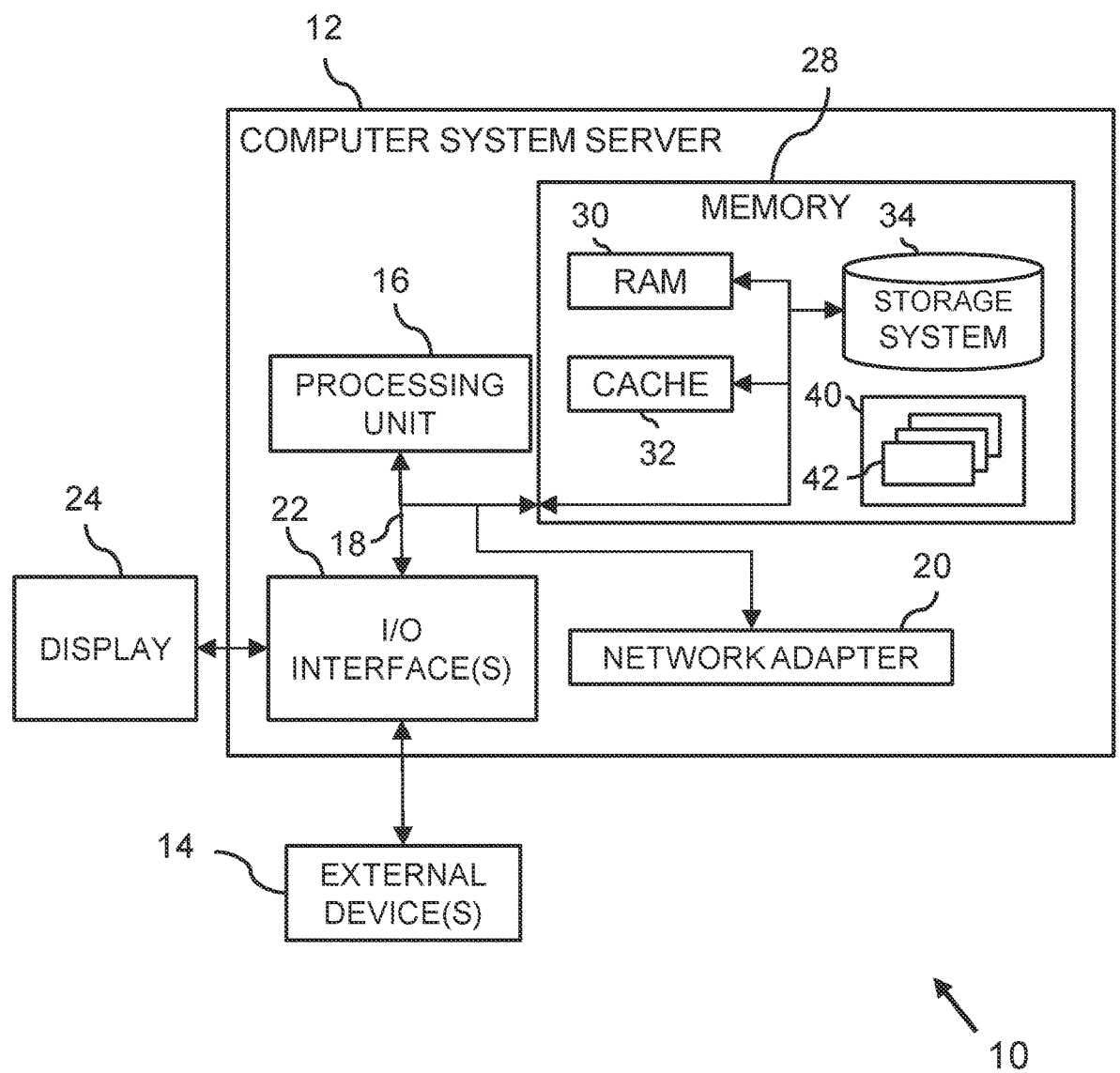
FIG. 1 depicts a cloud computing node according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Also, in the context of the present application, a system may be a single device or a collection of distributed devices that are adapted to execute one or more embodiments of the methods of the present invention. For instance, a system may be a personal computer (PC), a portable computing device (such as a tablet computer, laptop, smartphone, etc.), a set-top box, a server or a collection of PCs and/or servers connected via a network such as a local area network, the Internet and so on to cooperatively execute at least one embodiment of the methods of the present invention.

The technical character of the present invention generally relates to operations management, and more particularly, to incident management/resolution concepts that may, for example, identify runbooks for incident resolution at an edge computing environment. More specifically, embodiments of the present invention provide concept for automatically identifying runbooks for incident resolution, and such identification may employ machine learning techniques (such as doc2vec) to analyze incident information (e.g. from an edge device) and suggest/predict one or more runbooks suitable for resolving the observed incident.

Information about the identified runbook(s) and/or the identified runbook(s) may be supplied to an incident resolution solution deployed in an edge computing environment. Edge computing is a distributed computing paradigm which brings computation and data storage closer to the location it is needed, to improve response times and save bandwidth. In this paradigm, the smaller infrastructure components are distributed at the edge of the network. This facilitates the operation of end devices by acting as the relay to meet the needs of high-speed Internet of Things devices, thus reducing the bandwidth load of the network core. The same paradigm can be applied to cloud computing when it comes to connected devices. In such an arrangement, the first connection (i.e. hop) from smart devices, mobile phones, connected cars, drones, robots, etc. is not to large public clouds, but is instead to something closer, the Edge Cloud operating at the edge of the network. Unlike conventional incident management approaches, embodiments may propose concepts for intelligently determining which runbooks (from a centralized event management system) to distribute to a specific incident resolution solution deployed in an edge computing environment.

Embodiments may also be able to adapt to feedback and/or changing resources for future instances/occurrences of the same incident.

Embodiments may therefore obviate or mitigate problems associated with conventional incident management and/or resolution approaches, by providing a method, a system and a computer program product for identifying a runbook for incident resolution using machine learning algorithms. Also, concepts for training the machine-learning algorithms are provided.

The proposed concept(s) may achieve such benefits through the use of machine-learning training approaches employing a corpus of training incidents and training runbooks. In some embodiments, for example, training may comprise adjusting a configuration of the machine learning algorithm so as to decrease a difference between the identifier of a runbook for resolving a training incident and a second identifier that is output by the machine learning component. By way of further example, training may be based on transforming/translating descriptions of training incidents to points in a space, wherein different points in the space are associated with respective different identifiers of training runbooks from a corpus of training runbooks. That is, a machine-learning algorithm may be trained using a corpus of training runbooks and descriptions of training incidents.

For instance, training of the machine-learning algorithm may comprise adjusting a configuration of the machine learning algorithm so as to decrease a difference between: a target point in the space associated with the identifier of the runbook for resolving the training incident; and a second point in space that the machine learning algorithm transforms/translates the description of the training incident to. By way of further example, the training may comprise determining a mapping that transforms/translates the description of the training incident to a point in the space associated with the identifier of the runbook for resolving the training incident.

In proposed embodiments, transforming/translating may comprise applying the description of the training incident to a doc2vec model to obtain a vector representation of the point in the space. Doc2vec is a well-known method that is based on embedding known model techniques such as word2vec. Word2vec aims to represent and encapsulate different relationships between different words, using a Continuous Bag of Words model, and the Skip-Gram model. An example is relating the words "king" and "queen" the same way the words "man" and "woman" are related. Words can be related through synonyms, antonyms or analogies. Doc2vec works in a similar way, but is applied to entire documents, rather than individual words. Doc2vec can create numerical data to represent a document. Data used to train the doc2vec model may comprise samples of runbook triggers, past runbook run logs, as well as human feedback. Runbook triggers and logs are typically formatted and displayed in a way that is easy to read and differentiate, which may make them preferable for use within embodiments employing the doc2vec model.

However, by way of further example, a description of a training incident used for training may comprise: an identifier of an error; an identifier of an incident; an error code; an error log; a network trace; and log data relating to a predetermined time window preceding the training incident.

After training, the machine learning algorithm may be expected to be able to receive a description of an incident (e.g. an error log, a set of error logs, an identifier of an error; an identifier of an incident, etc.) and provide a prediction/suggestion of a runbook most probable to resolve the incident. The predicted/suggested runbook may then be distributed to one or multiple incident resolution edge systems. The runbook may either be executed immediately (e.g. in order to resolve the incident) and/or it could be stored for future incidents of the same kind.

A proposed embodiment may thus also provide a method of for incident resolution at an edge computing environment. The method comprises providing a description of an incident to a machine learning algorithm for identifying a runbook for incident resolution (i.e. a machine-learning algorithm trained according to a proposed embodiment). A prediction result is then obtained from the machine learning algorithm based on the description of the incident. The prediction result includes an identifier of a runbook. The method then generates a runbook trigger for executing the runbook associated with the identifier included in the prediction result.

In some implementations, the method may also include the step of communicating at least one of: the runbook trigger; and the runbook to an edge computing environment based on the description of the incident The runbook may be of an executable form (e.g. shell script, Ansible playbook, etc.). For example, both the runbook and runbook trigger may be sent to an edge device so that the edge device can trigger (i.e. execute) the runbook. The edge device may also store the runbook and runbook trigger related to the incident, so that if the same incident is detected in the future it will automatically trigger the related runbook.

It is understood in advance that although this disclosure includes a detailed description on cloud computing, implementation of the techniques recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the invention as described herein. For example, some or all of the functions of a DHCP client 80 can be implemented as one or more of the program modules 42. Additionally, the DHCP client 80 may be implemented as separate dedicated processors or a single or several processors to provide the functionality described herein. In embodiments, the DHCP client 80 performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
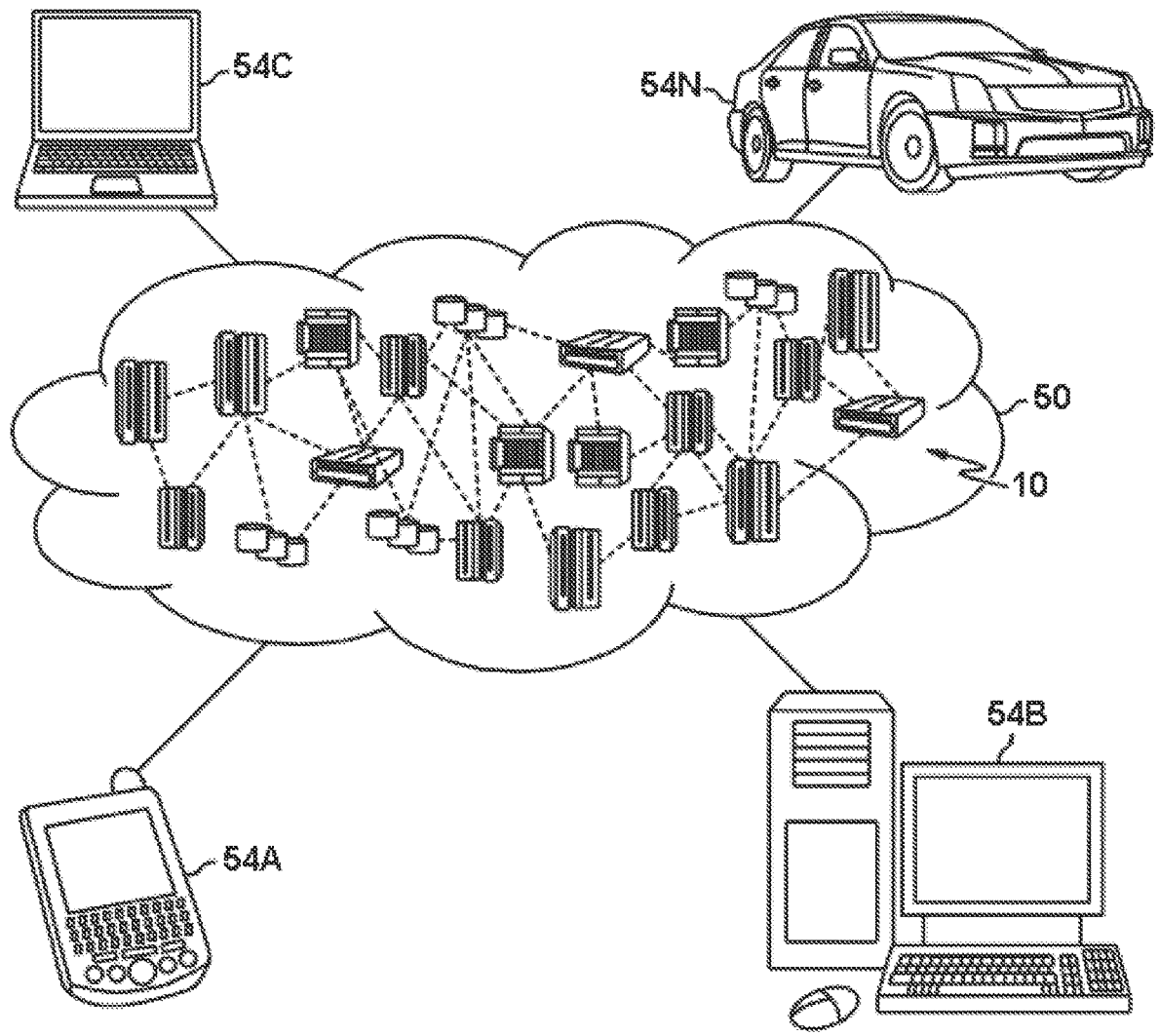
FIG. 2 depicts a cloud computing environment according to at least one embodiment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
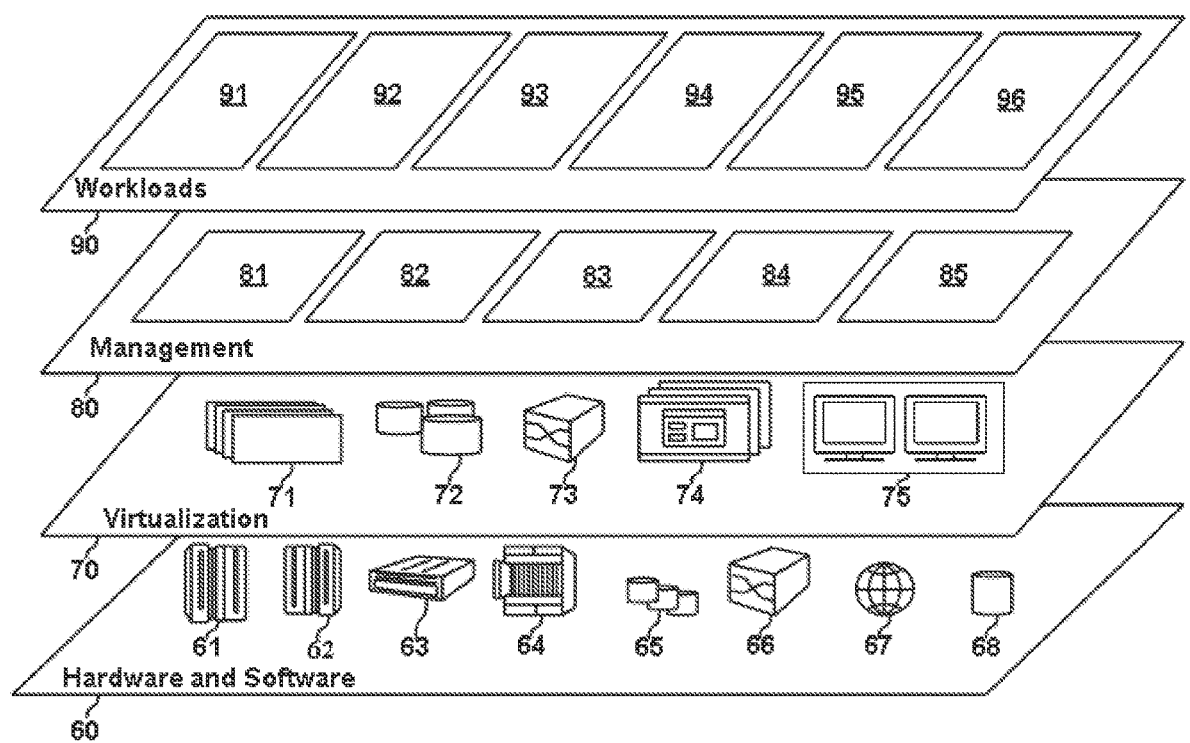
FIG. 3 depicts abstraction model layers according to at least one embodiment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incident management/resolution processes 96 described herein. In accordance with aspects of the invention, the incident management/resolution processes 96 workload/function operates to perform one or more of the processes described herein.

Figure 4:
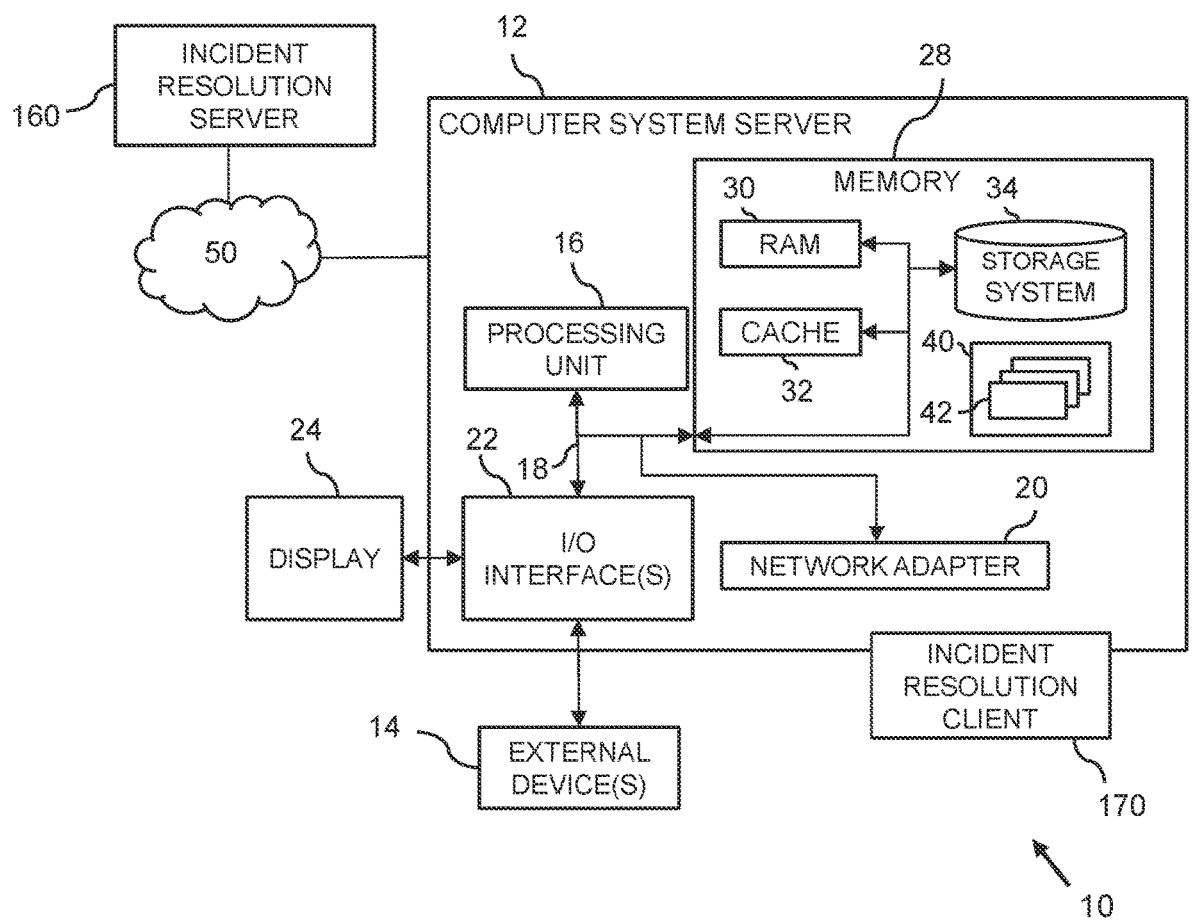
FIG. 4 depicts an exemplary cloud computing node implementing incident resolution according to at least another embodiment.

FIG. 4 depicts a cloud computing node which implements incident resolution according to another embodiment of the present invention. In particular, FIG. 4 is another cloud computing node which comprises a same cloud computing node 10 as FIG. 1. In FIG. 4, the computer system/server 12 also comprises or communicates with an incident resolution client 170, and an incident resolution server 160.

In accordance with aspects of the invention, the incident resolution client 170 can be implemented as one or more program code in program modules 42 stored in memory as separate or combined modules. Additionally, the incident resolution client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the invention.

By way of example, incident resolution client 170 may be configured to communicate with the incident resolution server 160 via a cloud computing environment 50. As discussed with reference to FIG. 2, for example, cloud computing environment 50 may be the Internet, a local area network, a wide area network, and/or a wireless network. In embodiments of the proposed incident resolution mechanism, the incident resolution server 160 may provision data to the client 170. One of ordinary skill in the art would understand that the incident resolution client 170 and incident resolution server 160 may communicate directly. Alternatively, a relay agent may be used as an intermediary to relay messages between incident resolution client 170 and incident resolution server 160 via the cloud computing environment 50.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Figure 5:
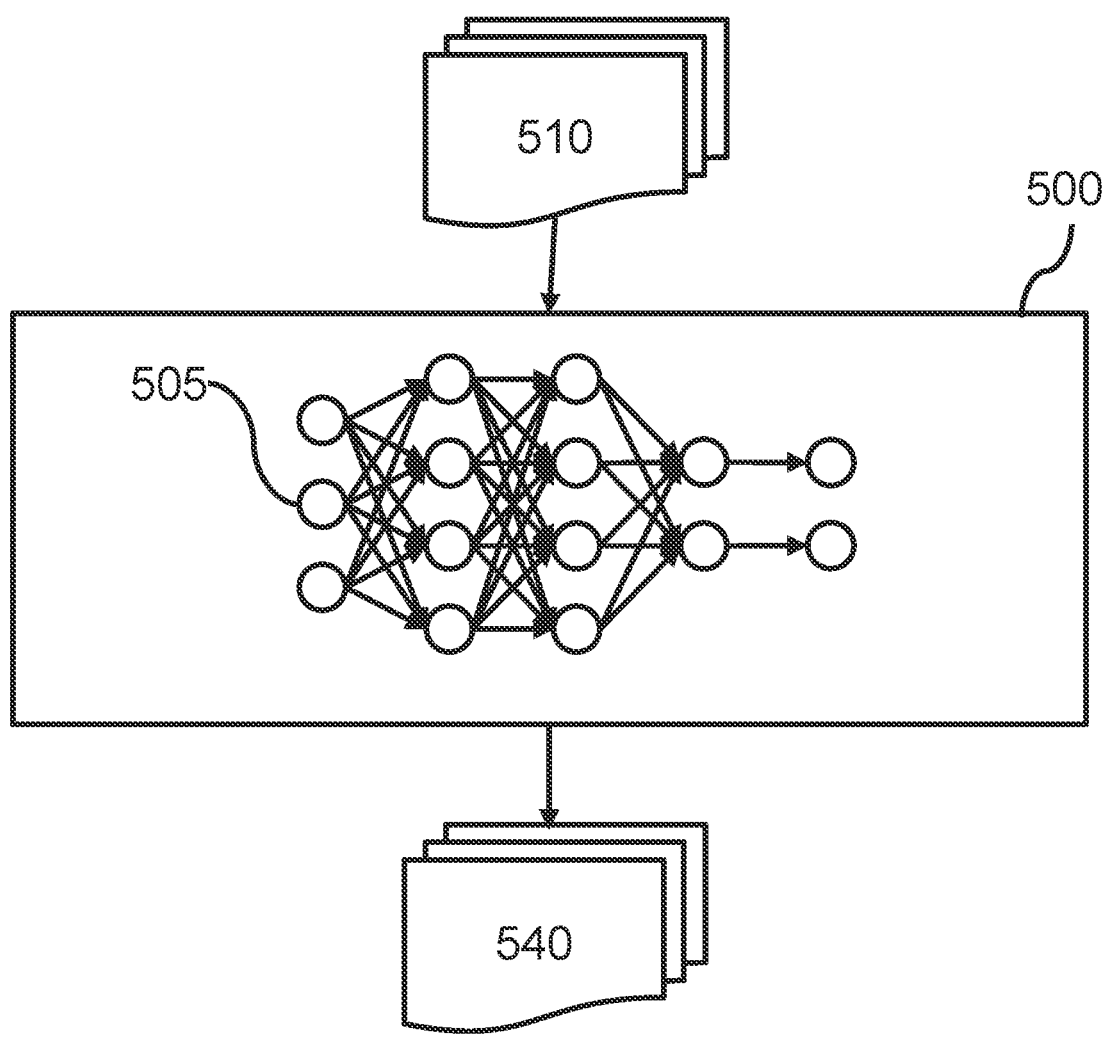
FIG. 5 depicts simplified diagrams of training a machine learning algorithm for identifying a runbook according to at least one embodiment.

FIG. 5 illustrates an example of training a machine learning algorithm for identifying a runbook for incident resolution according to an embodiment. The example embodiment of FIG. 5 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 5, there is depicted simplified diagram of training a machine learning algorithm according to an embodiment. Here, the machine-learning algorithm employs an artificial neural network 500.

The structure of an artificial neural network (or, simply, neural network) is inspired by the human brain. Neural networks are comprised of layers, each layer comprising a plurality of neurons 505. Each neuron comprises a mathematical operation. In particular, each neuron may comprise a different weighted combination of a single type of transformation (e.g. the same type of transformation, sigmoid etc. but with different weightings). In the process of processing input data, the mathematical operation of each neuron is performed on the input data to produce a numerical output, and the outputs of each layer in the neural network are fed into the next layer sequentially. The final layer provides the output.

There are several types of neural network, such as convolutional neural networks (CNNs) and recurrent neural networks (RNNs). Embodiments of the present invention employ a CNN-based learning algorithm, purely by way of example. CNNs typically contain several layers, including a convolutional layer, a pooling layer, a fully connected layer and a softmax layer. The convolutional layer consists of a set of learnable filters and extracts features from the input. The pooling layer is a form of non-linear down-sampling, reducing the data size by combining the outputs of a plurality of neurons in one layer into a single neuron in the next layer. The fully connected layer connects each neuron in one layer to all the neurons in the next layer. The softmax layer determines a probability distribution for each output.

Various approaches to training a machine-learning algorithm are known. Typically, such methods comprise obtaining a training dataset, comprising training input data entries 510 and corresponding training output data entries 540. An initialized machine-learning algorithm is applied to each input data entry 510 to generate predicted output data entries. An error between the predicted output data entries and corresponding training output data entries is used to modify the machine-learning algorithm. This process can be repeated until the error converges, and the predicted output data entries are sufficiently similar (e.g. ±1%) to the training output data entries. This is commonly known as a supervised learning technique.

For example, weightings of the mathematical operation of each neuron 505 may be modified until the error converges. Known methods of modifying a neural network include gradient descent, backpropagation algorithms and so on.

The training input data entries for the proposed machine learning algorithm correspond to descriptions of a training incidents. By way of example, a description of a training incident may comprise: an identifier of an error; an identifier of an incident; an error code; an error log; a network trace; and/or log data relating to a predetermined time window preceding the training incident.

The training output data entries for the proposed machine learning algorithm correspond to identifiers of runbooks for resolving the training incidents.

Several pre-processing methods may be employed to improve the training sample. For instance, the data sources to be used as a dataset to train the proposed machine learning algorithm may have differentiating formats. Therefore, some pre-processing may be executed to bring all training data to a common format. For this, a data pre-processor component may be used, and all data that is used to train the machine learning algorithm model may be passed through the pre-processor to achieve a consistent format of the training data.

The data format may be designed to preserve the relationship(s) between: (i) an error/incident (or a set of errors/incidents); and (ii) a runbook which resolves the error(s)/incident(s). In a simple form, the data may be represented as tuples of an incident and a runbook—(error1, runbookA), ([error2, error3], runbookB), etc.

The training data could either come from an initial data set (e.g. training data), or from data incoming from an event management deployment at an edge computing environment. The initial data set may be split into a training and test data set, to provide validation for the training process.

From the above description, it will be understood that embodiment propose training a machine learning algorithm based on a description of a training incident (as a training input for the machine learning algorithm) and the identifier of a runbook for resolving the training incident (as a training output for the machine learning algorithm). The training comprise adjusting a configuration of the machine learning algorithm so as to decrease a difference between the identifier of the runbook for resolving the training incident and a second identifier that is output by the machine learning component.

In particular, training according to proposed embodiment may comprise transforming/translating (i.e. mapping) the description of the training incident to a point in a space. In the space, different points in the space are associated with respective different identifiers of training runbooks from a corpus of training runbooks. Specifically, such training may comprise adjusting a configuration of the machine learning algorithm so as to decrease a difference between: a target point in the space associated with the identifier of the runbook for resolving the training incident; and a second point in space that the machine learning algorithm transforms/translates the description of the training incident to. In this way, the training may determine a mapping that transforms/translates (i.e. maps) the description of the training incident to a point in the space associated with the identifier of the runbook for resolving the training incident.

As an example, transforming/translating of a description of a training incident to a point in a space may be implemented by applying the description of the training incident to a doc2vec model to obtain a vector representation of the point in the space. In this way, doc2vec may be used to represent each incident or set of incidents as points in a space, where the distance between each point is contextually related to the set of runbooks that is available. Incidents which are resolved by the same runbook are expected to be represented in points closer to each other, compared to incidents that are not resolved by the same runbook. Overall, this may return a clustered overview of all observed errors. The runbooks become cluster centers in this cluster map—and essentially aims to end up with as many clusters as there are runbooks. That way, when a new and unseen incident is observed, the runbook that is most likely to improve the health of the impacted system can be accurately and confidently determined. Such application of a machine learning algorithm trained to identify a runbook for incident resolution according to the above-described concepts is illustrated in FIG. 6.

Figure 6:
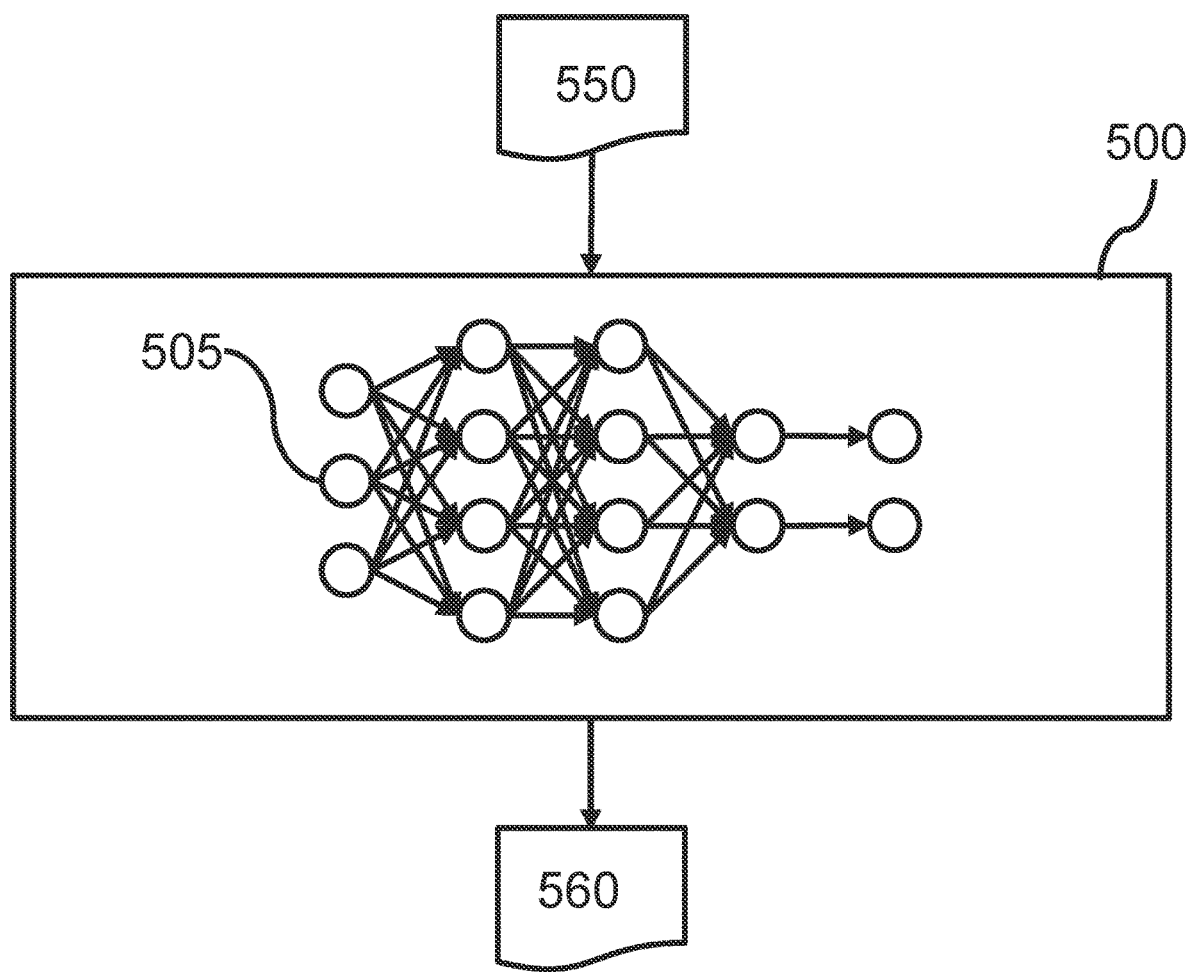
FIG. 6 depicts how the machine learning algorithm trained in FIG. 5 may be used for incident resolution according to at least one embodiment.

FIG. 6 is a simplified illustration depicting how the machine learning algorithm trained in FIG. 5 may be used for incident resolution according to a proposed embodiment.

When a new incident is observed a description 550 of the new incident (e.g. error code or error log) may be provided as an input to the artificial neural network 500, A prediction result 560 may then be obtained as an output from the artificial neural network 500, wherein the prediction result 560 includes an identifier of a runbook predicted to resolve the incident. A runbook trigger for executing the identified runbook may then be generated and distributed to the appropriate edge computing environment.

By way of further example, the description 550 of the new incident may be run through the doc2vec model to obtain the vector representation of the point in the cluster space. The distance between this new point and all other points in the space (i.e. the observed errors/incidents) can then be calculated. The shortest distance can be used to determine which error is most similar to the new unseen one, and which runbook should then be used (i.e. to which "cluster" is the new point part of).

Figure 7:
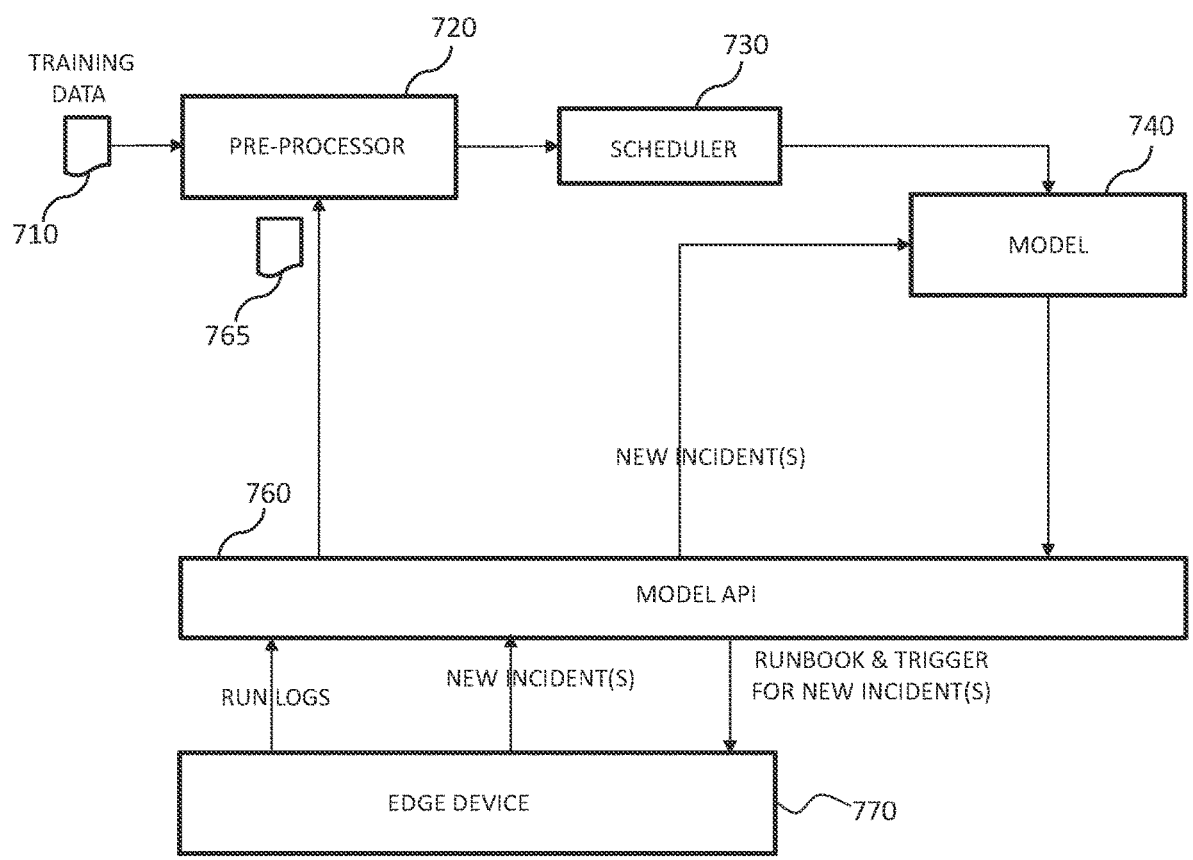
FIG. 7 illustrates a system for incident resolution according to at least one embodiment.

Referring now to FIG. 7, there is depicted a simplified block diagram of a system for incident resolution according to an embodiment. The diagrams illustrate an exemplary architecture of the main components of the system. The following sections below outline the function of each component and the communication between them. In this regard, it is noted that the described process is a deterministic end-to-end use case scenario of a system run. In practice, some stages (such as model training, or updating edge device with a new runbook) may execute by themselves (e.g. independently) or more often than other process.

Format the Training Data

Training data 710 (e.g. descriptions of training incidents and runbook identifiers for resolving the training incidents) is provided to a data pre-processor 720. The data sources providing the training data to be used train the machine learning algorithm may have differing formats. Pre-processing of the training data 710 is undertaken by the data pre-processor 720 to convert the training data 710 to a common format (or meet data formatting requirements). That is, all training data 710 used to train the machine learning algorithm is passed through the pre-processor 720 so as to achieve a consistent format of the training data 710.

It may be preferable to configure the data format so that it accurately preserves a relationship between an error/incident (or set of errors/incidents) and a runbook that resolves the error(s)/incident(s).

Also, the training data 710 may either be coming from an initial data set (training data 710), or from data incoming from the event management deployment on the edge layer. The initial data set would be split into a training data 720, to provide validation for the training process.

Set Up doc2vec Model Training Architecture

The main model training architecture contains of two components: the scheduler 730 and the model 740.

The scheduler 730 is provision to account for situations where the rate of the incoming data from all edge devices cannot be controlled. The scheduler 730 is configured to control the rate of data provided to the model 740 (e.g. machine learning algorithm or neural network). By way of example, the scheduler 730 may split all incoming data into batches, which may then be used for training.

The model 740 is configured to perform doc2vec transformation on the data. In doing so, the model 740 is configured to calculate how similar a new unseen incident is to any of the incidents that already known. With a known mapping between each known incident and a runbook, this similarity may be used to determine a suggested runbook for resolving the new incident.

Query the Algorithm/Model with a New Incident

This step of the process may either be triggered as a part of the regular algorithm/model training, or it may be part of the workflow to suggest a runbook activated by an edge device.

To assist the system with handling requests, a Model API 760 component is provided, which handles requests and responses related to the algorithm/model. An API interface of the Model API 760 takes a description of an incident (or a set of incidents) and passes the description 765 (i.e. data about the incident(s)) to the data pre-processor 720 for formatting. After being pre-processed (by the pre-processor 720) and scheduled (by the scheduler 730), the data reaches the model 740, which then returns a prediction about which of the runbooks already available has the highest chance of resolving the incident.

As part of the Model API 760, a method of prioritizing the request may be implemented. This may enable the pre-processor 720 to know to bypass the scheduler 730 (e.g. for cases when an immediate answer from the model 740 is required). For instance, if the data 765 needs to be executed as soon as possible, the Model API 760 may assign a priority property, which will then be recognized by the pre-processor 720. When the data 765 coming from Model API 760 contains such a priority property, it may be directly sent to the model 740.

Distribute and Trigger Identified Runbook in Edge Device

The Model API 760 is configured to extract key information about an incident and create a new runbook trigger. The Model API 760 then sends both the runbook and runbook trigger to the edge device 770 as a response to the request detailing the new incident. Since the edge device will then have a runbook trigger related to the incident, if the same incident is detected in the future it may automatically trigger the related runbook.

The predicted/suggested runbook for resolving an error may then be distributed in different scenarios. It could either be sent to a single incident resolution edge device, where the original incident occurred. Alternatively, it could be distributed to a set of devices, which are configured to monitor a specific kind of device.

The runbook may be of an executable form (e.g. shell script, Ansible playbook, etc.). Once the edge device 770 has received the runbook, it can execute the runbook. Preferably, the edge device 770 should maintain logs to see whether the runbook resolves the issue.

Resolve Incident Using Incident Resolution Edge Device

When an incident is detected by the edge device 770, the edge devices may first attempt to first resolve it locally. If it cannot, then it will contact the Model API 760 (e.g. located at a centralized event management solution according to a proposed embodiment), which may then then start a method of identifying a runbook according to the proposed concept(s). By way of example, such a process for identifying a runbook for incident resolution according to an embodiment is depicted in FIG. 8.

Figure 8:
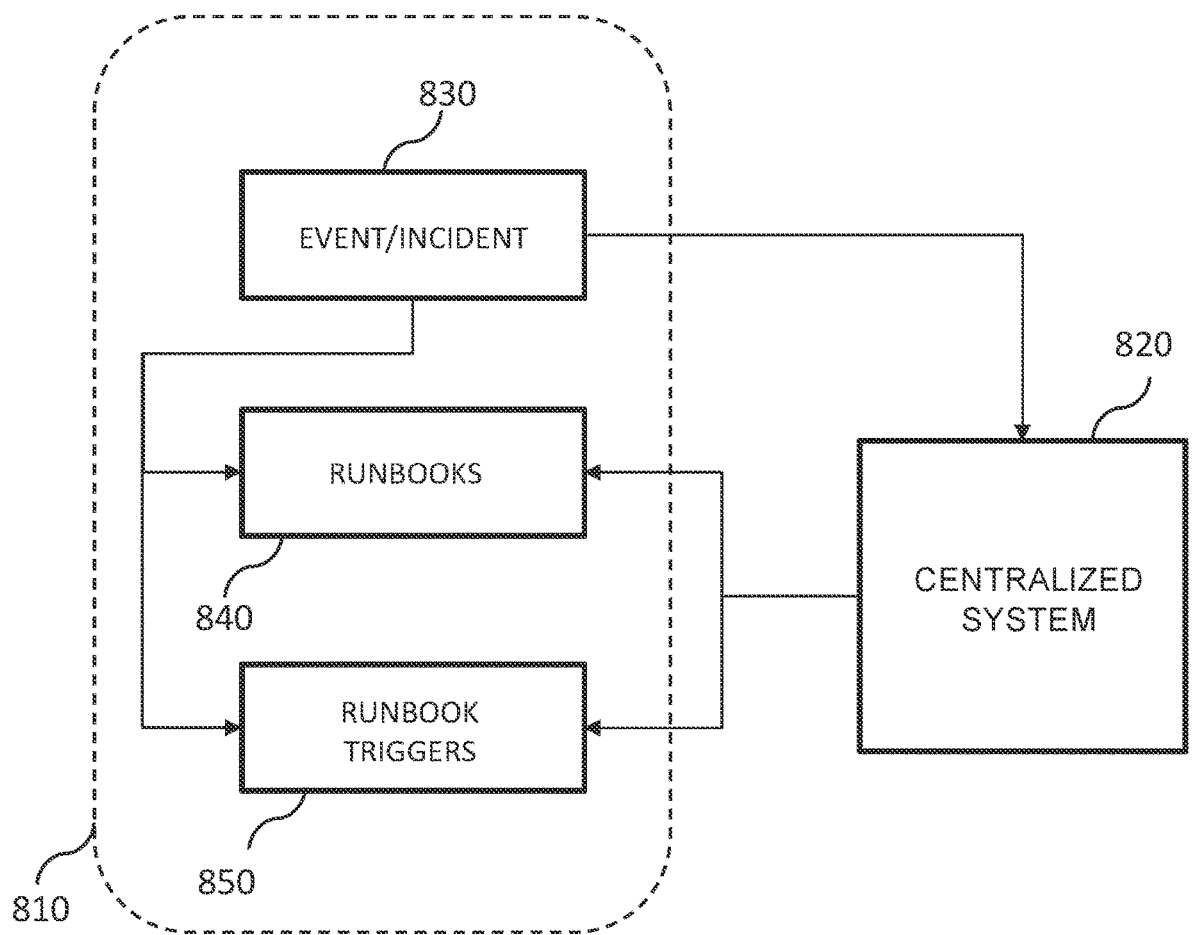
FIG. 8 illustrates a simplified process for incident resolution according to at least one embodiment.

FIG. 8 illustrates a simplified process for incident resolution according to an embodiment. The process employs a machine learning algorithm/model for identifying a runbook for incident resolution, wherein the machine learning algorithm/model is trained according to proposed concepts.

An event management system 810 at an edge layer is identified by the dashed line. The event management system 810 is adapted to be in communication with a centralized system 820 that employs a machine learning algorithm/model for identifying a runbook for incident resolution according to a proposed embodiment.

An event/incident 830 is detected at/by the event management system 810 at the edge layer. The event management system 810 then checks if a suitable runbook for resolving the event/incident 830 is available in its registry/store of runbooks 840. If not suitable runbook is identified, details about the event/incident 830 (such as an error code, an error log, a network trace; and/or log data) is provided to the centralized system 820. Based on such details, the machine learning algorithm/model of the centralized system 820 predicts/suggests a runbook for resolving the event/incident. The centralized system 820, then communicates the runbook (and a runbook trigger) to the event management system 810 of the edge layer. The event management system 810 then stores the received runbook in its registry/store of runbooks 840, and stores the received trigger in it registry/store of runbook triggers 850.

The process flows shown in FIGS. 7 and 8 are presented with reference to a single edge device. However, multiple deployed edge devices may follow the same process(es), e.g. they may connect to the same Model API 760 and upload data to train one runbook prediction model.

Furthermore, embodiments may also be configured to adapt/improve based on monitoring and/or feedback data. For instance, to verify how well the machine learning algorithm/model performs when suggesting runbooks, the success rate of each runbook can be tracked. This could be monitored either on a per-edge device basis, or throughout all deployments across a network environment. After executing the runbook, the edge device may verify the fix by analyzing the incoming logs from the monitored device, and check whether the error persists. If the error no longer exists, the suggested runbook may be marked as correct. Otherwise, the result may be considered incorrect and the statistic applied to the runbook success rate. Also, based on collected runbook execution logs, dynamic weighting may be assigned to each runbook. This weighting may be accounted for during runbook suggestion process.

Collected runbook execution data may be made accessible by an operator or a Site Reliability Engineer, so that manual analysis and/or modifications may be made.

It should now be understood by those of skill in the art, in embodiments of the present invention, the proposed machine-learning concepts provide numerous advantages over conventional incident resolution approaches. These advantages include, but are not limited to, efficient and accurate identification of a runbooks for resolving an incident. In embodiments of the present invention, this technical solution is accomplished by training/employing a machine learning algorithm/model.

In still further advantages to a technical problem, the systems and processes described herein provide a computer-implemented method for efficient incident resolution at edge computing environments, and runbook for such incident resolution may be provided on (or via) on a distributed communication network. In this case, a computer infrastructure, such as the computer system shown in FIGS. 1 and 4 or the cloud environment shown in FIG. 2 can be provided and one or more systems for performing the processes of the invention can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for method for incident resolution at an edge computing environment, the method comprising:
    receiving: i) a description of a training incident; and ii) a training identifier of a runbook for resolving the training incident;
    training a machine learning algorithm employing an artificial neural network and based on the description of a training incident as a training input for the machine learning algorithm and the training identifier of the runbook for resolving the training incident as a training output for the machine learning algorithm; wherein the training comprises mapping a description of the training incident to a point in a space, different points in the space being associated with a plurality of respective different training identifiers;
    providing a description of an incident to the trained machine learning algorithm for identifying a runbook for incident resolution;
    obtaining a prediction result from the trained machine learning algorithm based on the description of the incident, the prediction result including an identifier of a runbook;
    generating a runbook trigger for executing the runbook associated with the identifier included in the prediction result;
    modifying resources based on the runbook so future instances of a same or a similar incident can be prevented;
    adjusting a configuration of the machine learning algorithm so as to decrease an incident of a similar type is being caused in the future; and
    providing training output data entries for the machine learning algorithm that corresponds to identifiers of the runbooks for resolving any incident of said similar type.

2. The method of claim 1, wherein the training comprises mapping the description of the training incident to a point in a space, with respective different identifiers of training runbooks from a corpus of training runbooks.

3. The method of claim 2, wherein the training comprises adjusting a configuration of the machine learning algorithm so as to decrease a difference between: a target point in the space associated with the identifier of the runbook for resolving the training incident; and a second point in space that the machine learning algorithm maps the description of the training incident to.

4. The method of claim 2, wherein the training comprises:
    determining a mapping of the description of the training incident to a point in the space associated with the identifier of the runbook for resolving the training incident.

5. The method of claim 2, wherein mapping comprises applying the description of the training incident to a doc2vec model to obtain a vector representation of the point in the space.

6. The method of claim 1, wherein the training comprises:
    adjusting a configuration of the machine learning algorithm so as to decrease a difference between the identifier of the runbook for resolving the training incident and a second identifier that is output by the machine learning component.

7. The method of claim 1, wherein the description of the training incident comprises:
    an identifier of an error;
    an identifier of an incident;
    an error code;
    an error log;
    a network trace; and
    log data relating to a predetermined time window preceding the training incident.

8. The method of claim 1, wherein the machine learning algorithm is trained using a training algorithm configured to receive an array of training inputs and known outputs, wherein the training inputs comprise descriptions of training incidents and the known outputs comprise identifiers of runbooks for resolving the training incidents.

9. The method of claim 1, further comprising communicating at least one of: the runbook trigger; and the runbook to an edge computing environment based on the description of the incident.

10. The method of claim 1, further comprising:
    prior to providing the description of the incident to the machine learning algorithm, processing the description of the incident so as to meet a predetermined formatting requirement.

11. The method of claim 1, further comprising:
    receiving feedback on the prediction result; and
    modifying a configuration of the machine learning algorithm based on the received feedback.

12. A system for incident resolution at an edge computing environment, the system comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    receiving: i) a description of a training incident; and ii) a training identifier of a runbook for resolving the training incident;
    training a machine learning algorithm employing an artificial neural network and based on the description of a training incident as a training input for the machine learning algorithm and the training identifier of the runbook for resolving the training incident as a training output for the machine learning algorithm; wherein the training comprises mapping a description of the training incident to a point in a space, different points in the space being associated with a plurality of respective different training identifiers;
    providing a description of an incident to the trained machine learning algorithm for identifying a runbook for incident resolution;
    obtaining a prediction result from the trained machine learning algorithm based on the description of the incident, the prediction result including an identifier of a runbook;
    generating a runbook trigger for executing the runbook associated with the identifier included in the prediction result;
    modifying resources based on the runbook so future instances of a same or a similar incident can be prevented;
    adjusting a configuration of the machine learning algorithm so as to decrease an incident of a similar type is being caused in the future; and
    providing training output data entries for the machine learning algorithm that corresponds to identifiers of the runbooks for resolving any incident of said similar type.

13. The method of claim 12, wherein the training comprises mapping the description of the training incident to a point in a space, with respective different identifiers of training runbooks from a corpus of training runbooks.

14. The system of claim 13, wherein the training comprises adjusting a configuration of the machine learning algorithm so as to decrease a difference between: a target point in the space associated with the identifier of the runbook for resolving the training incident;
and a second point in space that the machine learning algorithm maps the description of the training incident to.

15. The system of claim 13, wherein the training comprises:
determining a mapping of the description of the training incident to a point in the space associated with the identifier of the runbook for resolving the training incident.

16. The system of claim 13, wherein mapping comprises applying the description of the training incident to a doc2vec model to obtain a vector representation of the point in the space.

17. A computer program product for incident resolution at an edge computing environment, the computer program product comprising a computer readable storage medium having program instructions embodied therewith, the program instructions executable by a processing unit to cause the processing unit to perform a method comprising:
receiving: i) a description of a training incident; and ii) a training identifier of a runbook for resolving the training incident;
training a machine learning algorithm employing an artificial neural network and based on the description of a training incident as a training input for the machine learning algorithm and the training identifier of the runbook for resolving the training incident as a training output for the machine learning algorithm; wherein the training comprises mapping a description of the training incident to a point in a space, different points in the space being associated with a plurality of respective different training identifiers;
providing a description of an incident to the trained machine learning algorithm for identifying a runbook for incident resolution;
obtaining a prediction result from the trained machine learning algorithm based on the description of the incident, the prediction result including an identifier of a runbook;
generating a runbook trigger for executing the runbook associated with the identifier included in the prediction result;
modifying resources based on the runbook so future instances of a same or a similar incident can be prevented;
adjusting a configuration of the machine learning algorithm so as to decrease an incident of a similar type is being caused in the future; and
providing training output data entries for the machine learning algorithm that corresponds to identifiers of the runbooks for resolving any incident of said similar type.

18. The method of claim 17, wherein the training comprises mapping the description of the training incident to a point in a space, with respective different identifiers of training runbooks from a corpus of training runbooks.

19. The computer program product of claim 18, wherein the training comprises adjusting a configuration of the machine learning algorithm so as to decrease a difference between: a target point in the space associated with the identifier of the runbook for resolving the training incident; and a second point in space that the machine learning algorithm maps the description of the training incident to.

20. The computer program product of claim 18, wherein the training comprises:
determining a mapping of the description of the training incident to a point in the space associated with the identifier of the runbook for resolving the training incident.

* * * * *